Figure 1:
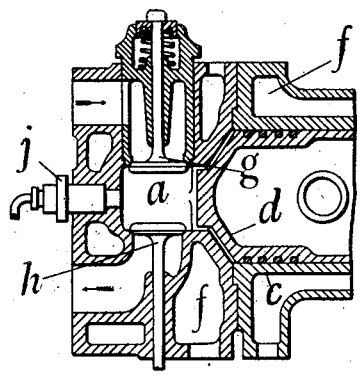

K. I. CROSSLEY AND W. LE P. WEBB.
INTERNAL COMBUSTION ENGINE.
APPLICATION FILED JULY 27, 1920.

1,423,086.

Patented July 18, 1922.

2 SHEETS—SHEET 1.

Inventors
K. I. Crossley
W. L. P. Webb,
By H. R. Kerslake
Attorney

K. I. CROSSLEY AND W. LE P. WEBB.
INTERNAL COMBUSTION ENGINE.
APPLICATION FILED JULY 27, 1920.

1,423,086.

Patented July 18, 1922.
2 SHEETS—SHEET 2.

Inventors
K. I. Crossley
W. L. P. Webb
By H. R. Kerslake
Attorney

UNITED STATES PATENT OFFICE.

KENNETH IRWIN CROSSLEY AND WILFRED LE PLASTRIER WEBB, OF MANCHESTER, ENGLAND.

INTERNAL-COMBUSTION ENGINE.

1,423,086.  Specification of Letters Patent.  Patented July 18, 1922.

Application filed July 27, 1920. Serial No. 399,392.

(GRANTED UNDER THE PROVISIONS OF THE ACT OF MARCH 3, 1921, 41 STAT. L., 1313.)

*To all whom it may concern:*

Be it known that we, KENNETH IRWIN CROSSLEY and WILFRED LE PLASTRIER WEBB, subjects of the King of Great Britain and Ireland, and residents of Openshaw, Manchester, in the county of Lancaster, England, have invented certain new and useful Improvements Relating to Internal-Combustion Engines (for which we filed an application for patent in Great Britain on February 21st, 1918, Patent No. 123,398), of which the following is a specification.

The object of our invention is to produce an improved construction and arrangement of combustion or explosion chamber and fuel injecting means for a four cycle internal combustion engine which is particularly suitable for a horizontal engine and for an engine having sufficiently large valves to enable it to run efficiently at high speeds, and which can be used as a high compression oil engine in which air only is drawn into the cylinder on the suction stroke and compressed into the combustion chamber to a high compression pressure and temperature on the compression stroke, the oil fuel being injected by itself in the form of spray into and as much as possible diffused throughout the compressed and heated air in the combustion chamber towards the end of the compression stroke, the temperature of the air being raised by the high compression to a sufficient degree to vaporize and ignite the oil as soon as the latter is sprayed into the combustion chamber, and before any oil spray or vapour can reach the walls thereof or the engine piston in a manner somewhat similar to what occurs in a Diesel engine but assisted by the agitation or turbulence created by the air entering the combustion chamber from the cylinder through the restriction caused by the end of the piston entering the combustion chamber. The engine can also readily be converted into a gas engine in which the fuel (gas or vapour) and air are drawn into the cylinder on the suction stroke the mixture being compressed into the combustion chamber on the compression stroke, and ignited by an electric spark, ignition tube or similar means.

According to our present invention we spray the oil in from or near the back of the chamber furthest from the piston and from either one or two oil injectors. We place the exhaust valve at the bottom and the air admission valve either at the top or at the side of the combustion chamber the latter being (locally) in the neighbourhood of these valves of approximately rectangular or square cross section where necessary the distance from side to side or from top to bottom being about equal to half the diameter of the cylinder. This enables us to make the combustion chamber of the correct capacity to obtain the high compression desired and at the same time to use large valves which are necessary when engines run at high speeds. The piston has a projection on its end which enters the combustion chamber at the end of the compression and the exhaust strokes. The said projection and the entrance to the combustion chamber are circular in form. The entrance to the combustion chamber may have a smaller cross sectional area than that of the central portion of the combustion chamber where the valves are situated.

If two oil injectors are used at the back of the combustion chamber they are preferably placed diagonally with each other so that the axial lines drawn through the two oil sprays will meet on or about the axial line of the chamber towards the pistons.

The back wall and the two side walls of the combustion chamber are flat or nearly flat when seen in front or side elevation respectively. When seen in plan view the wall at the back of the combustion chamber is in the form of a semicircle struck from a point at or near the centre of the air admission and the exhaust valve spindles. The cross section of the chamber is approximately rectangular or square in the neighbourhood of the air admission and exhaust valves and this section develops preferably gradually from approximately rectangular or square near the valves to a circular section where it emerges into the cylinder.

We usually provide a compressed air starter valve for enabling the engine to be started with compressed air. This is fitted at one side (and preferably on the operating gear side) of the combustion chamber if the air admission valve is at the top of the chamber, or at the top of the combustion chamber if the air admission valve is at the side.

When the combustion chamber is used for a gas engine, a lower compression is used than in the case of the high compression oil engine and this lower compression is obtained by using a piston which is not provided with a projection on its end such as is provided on the high compression oil engine piston. Also an electric sparking plug or hot tube or other separate igniter is fitted in either the aperture provided for the oil engine oil injector (which latter is not required in a gas engine) or and in the aperture for the oil engine igniter if such an aperture is provided.

We have previously described a combustion chamber. By adopting a more compact chamber than heretofore approximately rectangular or square in cross section where required in the neighbourhood of the valves we are able with a chamber of the same volume to use much larger valves which enables us to run the engine efficiently at considerably higher speeds.

Although we have described the combustion chamber as being particularly suitable for a horizontal engine it may also be used for a vertical or other engine if desired.

We have illustrated our invention by means of drawings in all of which the same or similar parts are indicated by the same reference letters. The compression space in the water jacketed combustion chamber is indicated at A, the cylinder of the engine at C, the piston at D, the projection on the end of the piston (when used for an oil engine) at E, the water jacket at F. F, the air admission valve at G, the exhaust valve at H, the oil injector at J. or J. J, the entrance passage from the cylinder into the combustion chamber at L and the compressed air starter valve at S.

Figure 2:
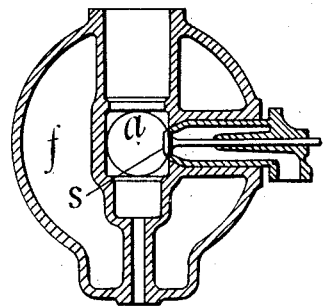
Figure 3:
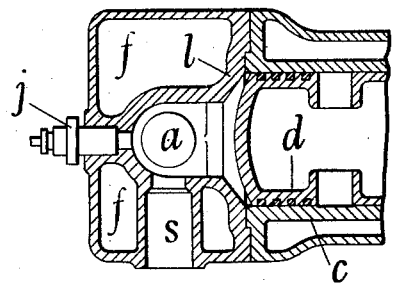

Figure 1 is a front sectional elevation, Figure 2 a cross sectional elevation, and Figure 3 a sectional plan showing one method of constructing the improved combustion chamber when the air admission valve is placed opposite the exhaust valve. The combustion chamber is shown in Figures 1 and 3 attached to the end of a water jacketed cylinder of a horizontal engine. The piston is shown with the projection E in Figure 1 as arranged for a high compression oil engine, and in Figure 3 as arranged without the said projection for a low compression gas engine. The air admission valve and exhaust valve are shown in their respective positions in Figure 1 only. The starter valve is shown in position in Figure 2 only. The oil sprayer is shown in both Figures 1 and 3. The oil sprayer is placed at the back of the combustion chamber, the oil being injected by any suitable means by itself in the form of fine spray into the combustion chamber at or near the end of the compression stroke of the engine piston, the temperature of the air in the combustion chamber being sufficiently high to ignite the oil spray before it reached the walls of the chamber or the end of the piston.

Figure 4:
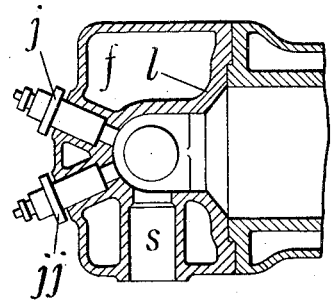

In some cases we prefer to use two separate oil injectors and in this case we prefer to arrange them diagonally to each other at the back of the chamber, such for instance, as shown in Figure 4 with their axial lines meeting on or about the axial line of the chamber.

Figure 5:
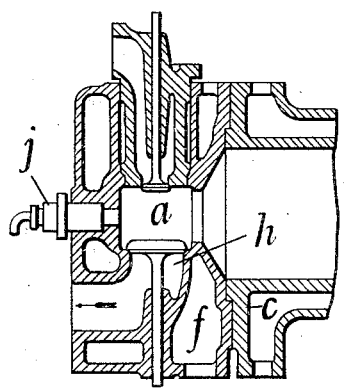
Figure 6:
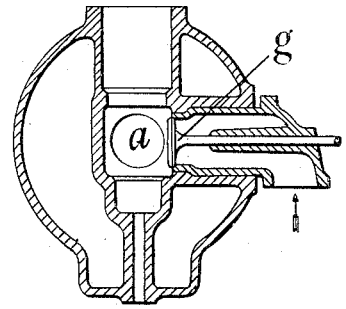
Figure 7:
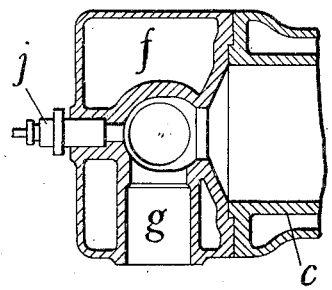

The entrance to the combustion chamber from the cylinder may be smaller than the central portion of the chamber in the neighbourhood of the valves as shown for example in Figures 5, 6, and 7 the chamber being then about vertically cylindrical with the entrance from the engine cylinder at its side.

When the engine is to work as a gas engine, a piston with a modified end is used as shown in Figure 3. This enables a lower compression to be used. The gas and air are drawn in through the air admission valve, and a suitable igniter, such as an electric ignition plug is inserted at J in place of the oil injector used on the oil engine.

In Figures 5, 6, and 7 we have illustrated an alternative arrangement of combustion chamber which may sometimes be convenient, the chief difference as compared with the first described arrangement being that the air admission valve and the compressed air starting valve change places, the latter being placed opposite the exhaust valve.

When the combustion chamber is made with provision for two oil injectors as illustrated in Figure 4, and is used for an oil engine either two oil injectors may be used as shown at J and J. J, or one of these such as J may be replaced with an igniter, say an electric sparking plug, which may be used temporarily as an auxiliary igniter in case of emergency, such as when an insufficient supply of compressed air is available for starting the engine. When this arrangement of combustion chamber is used for a gas engine, two igniters may be used at J and J. J.

Having now described our invention what we claim is:—

1. In four stroke cycle internal combustion engines, the combination comprising a combustion chamber in part rectangular and having a circular opening at one end of less cross sectional area than the said rectangular part and a semi-circular closure at the opposite end, admission, exhaust and starter valves on the respective sides of the said rectangular part, a piston having a projecting part thereon entering the said circular opening in the combustion chamber, and fuel injecting means in the said semi-circular end of the combustion chamber injecting the fuel in the form of spray and diffusing it throughout the compressed and heated air in the combustion chamber towards the end of the compression stroke so that vaporization and ignition of the fuel occurs before the spray can impinge upon any metal surface, as set forth.

2. In four stroke cycle internal combustion engines, the combination comprising a combustion chamber in part rectangular and having a circular opening at one end of less cross sectional area than the said rectangular part and a semi-circular closure at the other end, the distance from side to side of said rectangular part being approximately equal to one half the diameter of the engine cylinder, admission, exhaust and starter valves on the respective sides of the said rectangular part, a piston having a projecting part thereon entering the said circular opening in the combustion chamber and fuel injecting means in the said semi-circular end of the combustion chamber injecting the fuel in the form of spray and diffusing it throughout the compressed and heated air in the combustion chamber towards the end of the compression stroke so that vaporization and ignition of the fuel occurs before the spray can impinge upon any metal surface, as set forth.

In testimony whereof we have signed our names to this specification.

KENNETH IRWIN CROSSLEY.
WILFRED LE PLASTRIER WEBB.